Oct. 20, 1959
M. A. MEYER
2,909,656
SELECTIVE CIRCUIT
Filed Jan. 6, 1953
2 Sheets-Sheet 1
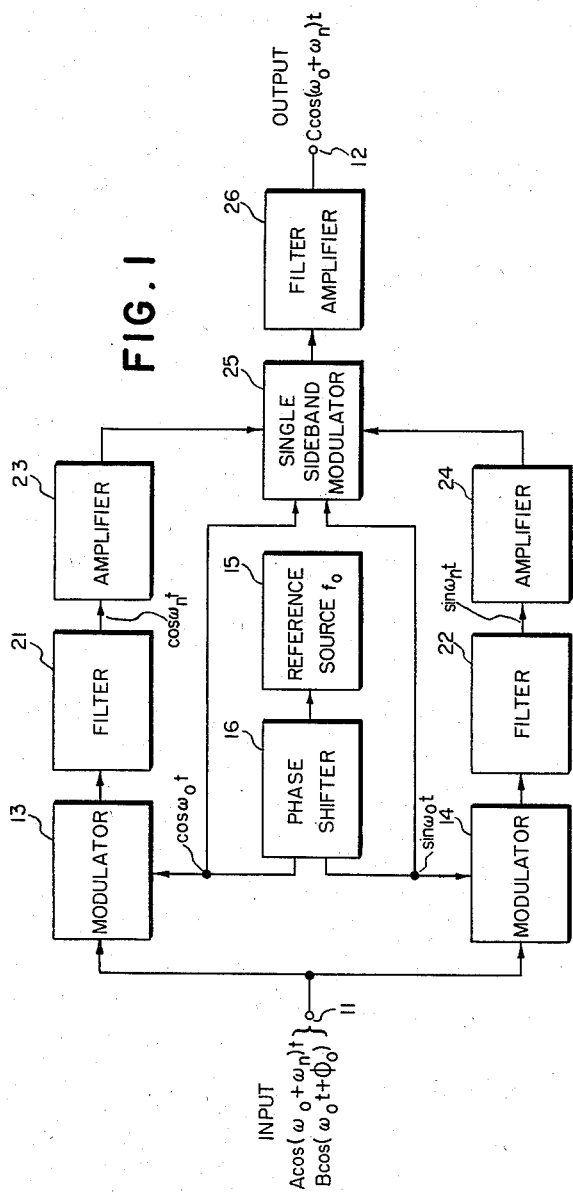
INVENTOR
MAURICE A. MEYER
BY Joseph Weingarten
ATTORNEY INVENTOR
MAURICE A. MEYER
BY Joseph Weingarten
ATTORNEY

United States Patent Office 2,909,656
Patented Oct. 20, 1959

2,909,656

SELECTIVE CIRCUIT

Maurice A. Meyer, Natick, Mass., assignor to Laboratory For Electronics, Inc., Boston, Mass., a corporation of Delaware Application January 6, 1953, Serial No. 329,803

16 Claims. (Cl. 250—27)

The present invention relates in general to frequency sensitive electric circuits and more particularly concerns a filter arrangement offering exceptional selectivity and capable of substantially wholly rejecting or selecting a predetermined frequency or frequency band from a complex wave transmission.

The filter circuit art is presently quite extensive and numerous texts and handbooks are available which disclose optimum filter circuit designs for the frequency selective problem under consideration. Probably the most commonly used filter is a passive network designed to function as low pass, high pass or band pass with respect to impressed signal. Such networks are relatively effective in many applications, however, where sharp discrimination against unwanted frequencies is desired, difficulties are encountered in fabricating circuit components of sufficiently high effective Q at moderate cost.

Many specialized passive and active filter arrangements are known where relative selectivity may be further increased by crystals, negative feedback, balanced bridge networks, or the like. But such filters require critical adjustment, and quite often still fail to provide the high selectivity essential in certain electrical systems.

As a representative example of exacting filter requirements, consider an airborne continuous wave Doppler radar system arranged for ground speed determination. Ordinarily, the signal return to such apparatus lies within a fairly broad frequency spectrum which is a function among other things of relative speed and antenna angle. Suitable circuits, beyond the scope of this discussion, are available for extraction of pertinent data from the Doppler spectrum. However, unless special precautions are observed, the informational data in the Doppler return may be wholly obscured by signal leakage from transmitter to receiver which occurs through the duplexer and other means. If the ground speed is relatively great, then the displacement of the frequency spectrum of the Doppler return from the transmitted carrier wave will be sufficiently large to permit conventional filtering for leakage elimination. But customary techniques are ineffectual when the ground speed is quite low, as would be the case where a helicopter hovers near zero speed. The best duplexing means presently available are insufficient to preclude substantial carrier leakage, and most often, the leakage signal power input to the receiver is considerably in exces of the integrated power in the received Doppler components.

The present invention contemplates and has as a primary object the provision of novel filter circuitry offering frequency selectivity hitherto unattainable for the selection or rejection of specified signals in a complex transmission. As applied to the specialized radar problem noted above, the concepts of this invention permit substantially total rejection from the Doppler return of carrier leakage virtually without disturbance of Doppler components minutely removed from carrier frequency in the frequency spectrum. Taken in general terms, application of this invention permits the attainment of effective filter Q of extraordinary proportions.

Broadly speaking, the present invention discloses means whereby the frequency band which encompasses the signal to be rejected is reduced in frequency in such manner that the critical frequency is changed precisely to zero, or D.C. In the lowered frequency band, this direct current component and substantially little else is selectively eliminated, and the remainder shifted back to reconstruct the initial signal with the critical frequency absent.

In order that this fundamental concept be successful in practical application, it is essential to ensure that the frequency reduction is exactly equal to the frequency increase subsequent to the elimination of the direct current component. Further, care must be exercised to avoid relative distortion of the unrejected signals with respect to amplitude and phase, and further, that the correct sense is maintained in the desired frequency band through both frequency shifts.

It is therefore an object of this invention to provide a filter circuit wherein signal modulation techniques are utilized to translate a frequency band to a region in the frequency spectrum where selective filtering is more readily accomplished, and then return the signal remainder to its initial position in frequency.

Another object of this invention is to provide a band pass filter circuit wherein signal rejection is accomplished by blocking the passage of a direct current.

Still another object of this invention is to combine balanced modulation and single side-band modulation techniques with customary filter arrangements whereby an overall filter is obtained exhibiting exceptionally high effective Q values.

A further object of this invention is to provide a filter offering a sharp selectivity characteristic at a frequency which may be readily adjusted over extensive ranges.

These and other objects of the present invention will now become apparent from the following detailed specification taken in connection with the accompanying drawing in which:

Fig. 1 is a generalized and functional block diagram illustrating the interconnection of principal components forming the filter system of this invention;

Fig. 3 is a graphical illustration of the frequency characteristic of a component within the system shown in Figs. 1 and 2; and Fig. 4 is a graphical illustration of the overall frequency characteristic of the filter arrangement disclosed in Figs. 1 and 2.

Figure 2:
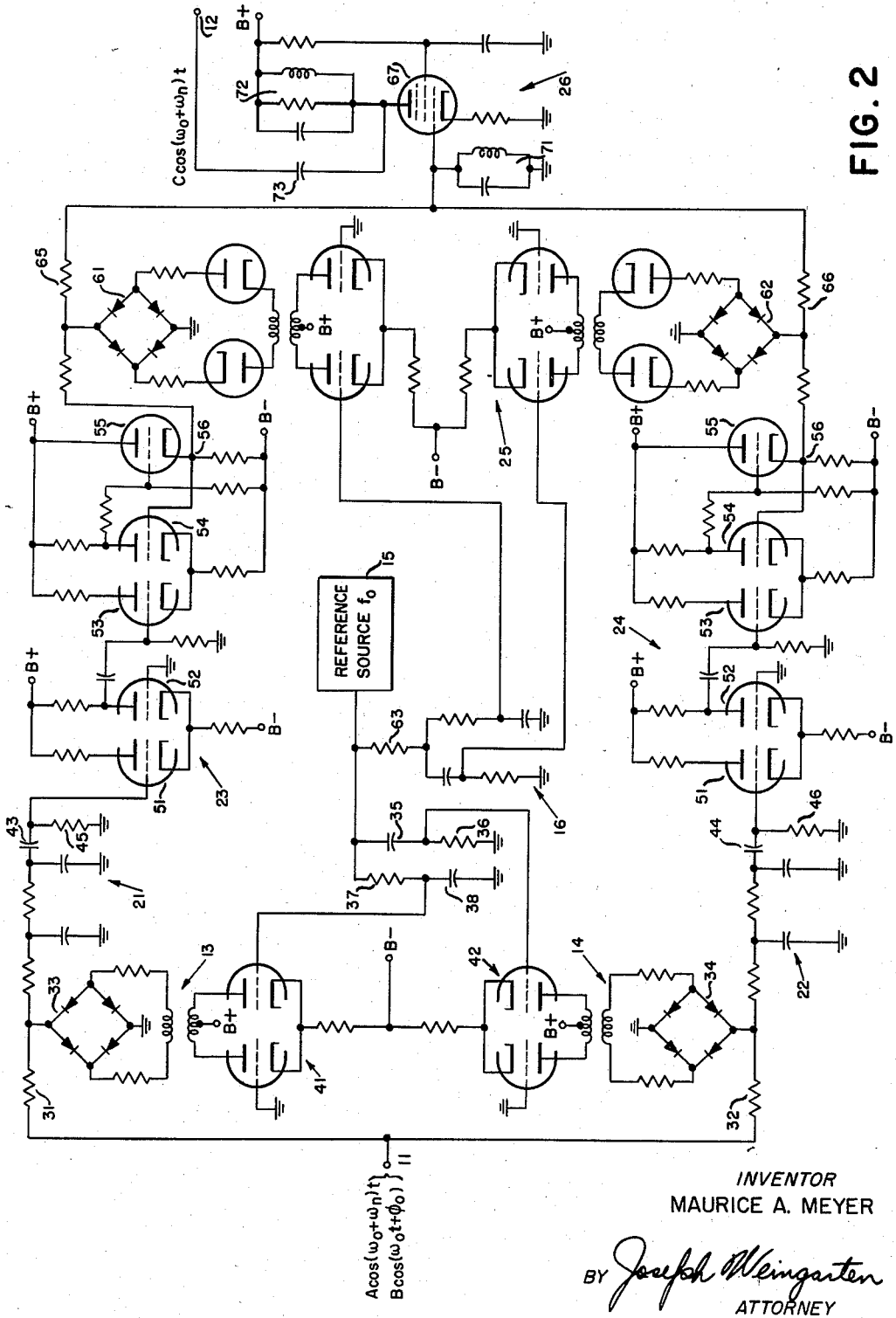
Fig. 2 is a schematic circuit diagram of the filter disclosed generally in Fig. 1.

With reference now to the drawing, and more particularly to Fig. 1 thereof, there is illustrated in block form the organization of circuits forming a filter having the extraordinarily high Q hereinabove noted. As will become apparent from the discussion which follows, the circuit illustrated in Fig. 1 has the characteristic that signals within a predetermined design range as applied to input terminal 11 appear at output terminal 12 unaltered with the exception that signal components within a band centered frequency $f_0$ are substantially wholly rejected. That is to say, the circuit shown in Fig. 1 is a band rejection filter, where the band is extremely narrow and almost entirely limited to frequency $f_0$. Analytically, this may be expressed by considering the input signal at terminal 11 to comprise a mixture of two signals designated as:

$$A \cos(\omega_0 + \omega_n)t \text{ and } B \cos(\omega_0 t + \phi_0)$$

where:

A and B are relative signal amplitudes, $\omega_0+\omega_n$ is representative of a frequency band not inclusive of $f_0$, and $\phi_0$ is a relative arbitrary phase angle.

Treating the Doppler radar system previously mentioned as a practical illustration, the first of these two signals represents the frequency shifted Dopler spectrum while the second of these signals represents input carrier leakage at frequency $f_0$. It is quite possible that at times the power leakage at $f_0$ is considerably in excess of the total power content of the Doppler spectrum. Since the circuit disclosed in Fig. 1 is capable of substantially excluding passage therethrough of signals at frequency $f_0$, the output signal at terminal 12 may be expressed as:

$$C \cos (\omega_0+\omega_n)t$$

where C is the relative amplitude of the output signal.

The sharp rejection at frequency $f_0$ is achieved by mixing the combined input signal at terminal 11 in a pair of balanced modulators 13 and 14 in phase, together with quadrature signals at frequency $f_0$, designated respectively as $\cos \omega_0 t$ and $\sin \omega_0 t$, derived from reference source 15 through phase shifter 16. The difference frequency outputs of modulators 13 and 14 are selected for further transmission and, as is apparent, any input signal component at terminal 11 of frequency $f_0$ will be reduced precisely to zero frequency, or D.C. Filters 21 and 22 energized by modulators 13 and 14 respectively, reject signals at other than difference frequency and in addition selectively remove direct current from the difference frequencies. Consequently, the filter outputs are essentially quadrature sinusoidal signals only at the difference frequencies $\omega_n$.

These quadrature signals, indicated as $\cos \omega_n t$ and $\sin \omega_n t$ on the drawing, are coupled through amplifiers 23 and 24, and then together with the quadrature components of the reference frequency source at the output of phase shifter 16, are applied to single side-band modulator 25. Filter amplifier 26 is arranged whereby only frequency sums without higher order modulation products are applied to output terminal 12.

Evidently the signal at output terminal 12 is comprised of all frequency components which initially appeared at the input with the exception of those represented by the difference frequency components removed in filters 21 and 22. Since substantially little else besides D.C. in the frequency difference band was rejected in these filters, and since D.C. there represented frequency $f_0$, an extremely sharp filter rejecting the reference source frequency $f_0$ is obtained.

In the ordinary mixing operation, the output signals of reduced frequency do not carry intrinsic information as to whether the frequencies therein represent values which initially were greater or less than the reference source. In the novel arrangement disclosed in Fig. 1, the sense of the difference frequency is maintained by employing two modulators energized separately with sine and cosine components of the reference. When the signals are ultimately combined in single side-band modulator 25, there are automatically generated frequencies equal to those applied to the system input, less those selectively filtered.

In Fig. 2 there is disclosed a schemtic diagram illustrative of one circuit embodiment which has been successfully used to implement the concepts disclosed in Fig. 1, and for assistance in noting similarity between the figures, like reference numerals have been affixed wherever applicable. Specifically, the signal applied to input terminal 11 is coupled through load resistors 31 and 32 to the diode bridges 33 and 34 within the balanced modulators 13 and 14, respectively. The signal output of reference source 15 at frequency $f_0$ is applied in phase shifter 16 to a pair of parallel networks, namely capacitor 35 and resistor 36, and resistor 37 and capacitor 38, to yield the quadrature modulating signals. Once adjusted to provide the 90° shift, the quadrature relationship is unaffected by changes in frequency $f_0$. These signals are coupled to the diode bridges through differential amplifiers 41 and 42.

The difference frequency modulation products are selected by the low-pass input sections of filters 21 and 22, and by means of capacitors 43 and 44, the zero frequency components are removed. Upon suitable adjustment and selection of the relative value of capacitor 43 with respect to resistor 45, and correspondingly of capacitor 44 with respect to resistor 46, these filters may be made to block substantially little other than direct current.

Fig. 3 graphically illustrates the low frequency end of the frequency characteristic of filters 21 and 22. The cut-off frequency $f_c$ may be chosen at substantially any value, and where high Q is desirable, $f_c$ should be as close to zero frequency as possible.

Amplifiers 23 and 24 following filters 21 and 22, respectively, are identical and each include a pair of cathode coupled triodes 51 and 52 driving a unity gain, low drift, zero D.C. level stage consisting of cathode-coupled triodes 53 and 54 and a triode-cathode follower 55. The latter tube provides at junction 56, the driving signal for the single side-band modulator and negative feedback stabilization for triode 54. Zero D.C. level is essential, since D.C. in this circuit would means extraneous signals at reference source frequency in the output.

Single side-band modulator 25 is formed essentially of a pair of balanced modulators including diode bridges 61 and 62. The high-frequency quadrature drive for the balanced modulator is taken as illustrated from phase shifter 16 in R-C networks similar to those already described in connection with the inputs to modulator 13. Resistor 63 is inserted between these resistance-capacitance phase shift networks and ground to reduce the reference signal level at frequency $f_0$ as applied at the balanced modulator. Low signal level here prevents leakage at frequency $f_0$ to the system output where such leakage would obviously be effective to lower system selectively.

The output of single side-band modulator 25 is taken from the common junction of adding circuit resistors 65 and 66 and applied to the control grid of pentode amplifier 67, whose grid and plate circuits contain resonant circuits 71 and 72, respectively, which in combination afford a filter that rejects the higher order modulation products. The system output terminal 12 is coupled to the plate of pentode 67 through capacitor 73.

The effect of the low frequency response characteristic illustrated in Fig. 3 on the entire system subsequent to remodulation in the single side-band modulator 25 is graphically demonstrated in the frequency characteristic of Fig. 4. Thus, it may be seen that the circuit of Figs. 1 and 2 has a substantially uniform pass characteristic with the exception that in the region of frequency $f_0$ the output dips sharply to a relative response near zero.

Utility of the invention disclosed herein is best illustrated with reference to specific test performance. With a reference frequency $f_0$ of 500 kcs., D.C. filters were chosen so that the half power point (frequency $f_c$ in Fig. 3) in each was 0.55 cycle per second. After remodulation in the single sideband modulator 25, this filter characteristic was translated to a sharp notch as shown in Fig. 4 with a total bandwidth of 1.4 cycles per second at the half power point. Theoretically, since the filters 21 and 22 pass no D.C., the notch filter shown in Fig. 4 has infinite rejection at the reference frequency. Practically, in the test performed, the single side-band modulator 25 reintroduced a small amount of leakage signal at the reference frequency $f_0$ and the total rejection ratio was found to be 80 db. Considering an LC filter designed for substantially the same rejection at 500 kcs., with the above stated bandwidth, the effective Q would have to $2 \times 10^9$. Such values of Q are not ordinarily realizable.

In addition to offering especially high Q, the rejection filter herein disclosed has the advantage that unlike crystals or similar filter devices, it is capable of being tuned over extended frequency ranges. Note that the frequency rejection band is centered precisely on the frequency of the reference source. Consequently, filter tuning may be effected by simply adjusting the reference source to the frequency to be rejected. Nothing shown in the circuits of modulators 13 and 14, filters 21 and 22, amplifiers 23 and 24, phase shifter 16, or single side-band modulator 25 need be adjusted to accommodate changes in reference source frequency $f_0$.

The circuitry disclosed herein functions as a band rejection filter; however, with little alteration, these principles may be utilized as a band selection filter, which, if desired, has equally high effective Q. The frequency components selected are governed largely by the nature of the outputs of filters 21 and 22. Thus, if in filter 21, capacitor 43 and resistor 45 were reversed in position, and correspondingly, if capacitor 44 and resistor 46 were reversed in filter 22 (and if suitable grid returns were then provided for triodes 51) the inputs to amplifiers 23 and 24 would comprise a band of low frequency components including D.C. which would ultimately appear at terminal 12 as a narrow band of signals including $f_0$. Bandwidth may be controlled by filter component selection, and of course, numerous filter combinations are possible. Whether the circuit is used as band selection or rejection, the feature of adjustability by variation of source frequency $f_0$ is still available.

The specific circuit elements shown in the schematic diagram Fig. 2 are not in themselves critical and, of course, it would be possible to use modulators, phase shifters, and amplifiers having entirely different designs and modes of operation. In general, these circuits are well known and many suitable and easily applicable modifications thereof exist. Fundamental concepts are shown in Fig. 1 and it is not intended that the present invention should be in any way confined to the specific embodiment shown in Fig. 2.

In view of the fact, therefore, that numerous modifications and departures may now be made by those skilled in this electrical art, the invention herein is to be construed as limited only by the spirit and scope of the appended claims.

What is claimed is:

1. Frequency sensitive apparatus comprising, means for uniformly shifting input signals in a first frequency spectrum to a second frequency spectrum which includes zero frequency, means for selectively filtering zero frequency signals in said second frequency spectrum and means for uniformly restoring filtered signals in said second frequency spectrum to said first frequency spectrum.

2. Filter apparatus for selectively rejecting a predetermined signal frequency from an input signal spectrum comprising, means for uniformly translating the frequency spectrum of said input signals whereby said predetermined signal frequency corresponds with direct current, means for substantially wholly rejecting direct current in said translated frequency spectrum to provide a remainder signal, and means for uniformly restoring components of said remainder signal spectrum to their initial frequencies in said input signal spectrum.

3. Apparatus for selectively filtering an input signal comprising, first and second modulators, a reference signal source, means for applying said input signal to said modulators in phase, means for applying first and second quadrature components of said reference signal to said first and second modulators respectively, means for selectively filtering the outputs of said modulators and means for remodulating the filtered modulator outputs with said reference signal quadrature components.

4. Frequency sensitive apparatus having input and output terminals, first and second modulators coupled to said input terminal, a reference signal source, phase shifter means coupling said reference source to each of said modulators, a single side-band modulator coupled to said reference source through said phase shifter and additionally coupled to said first and second modulators, and means coupling said output terminal to the output of said single side-band modulator.

5. Frequency sensitive apparatus for selectively altering the frequency spectrum of signals applied to an input terminal comprising, a reference signal source, first and second modulators for mixing signals at said input terminal with quadrature components of said reference signal, means for filtering the outputs of said modulators and a single side-band modulator for mixing the outputs of said first and second modulators with said quadrature components.

6. A high Q filter for rejection of a predetermined frequency in an input signal comprising, a first modulator for mixing said input signal with a signal of said predetermined frequency, means for selecting difference frequency outputs of said modulator while substantially rejecting direct current therefrom, a second modulator for mixing said difference frequency outputs with said signal of said predetermined frequency, and means for selecting frequency sums from said second modulator to provide said filter output signal.

7. Apparatus for substantially wholly rejecting the frequency of a reference source signal from an input signal comprising first and second modulators energized by said input signal and by first and second quadrature components respectively of said reference signal, means for selecting the difference frequency outputs of said first and second modulators while substantially rejecting direct current therefrom to provide first and second modulating signals in phase quadrature, a single side-band modulator for mixing said first and second quadrature components of said reference respectively with said first and second modulating signals, and means for selecting frequency sums from said single side-band modulator.

8. Apparatus for substantially wholly rejecting the frequency of a reference source signal from an input signal comprising, means for deriving first and second reference frequency signals in phase quadrature, first and second modulators, means for mixing said input signal and said first quadrature reference signal in said first modulator, means for mixing said input signal with said second quadrature reference signal in said second modulator, means for selecting difference frequency output components of said first and second modulators, means for selectively filtering said difference frequency components thereby providing first and second quadrature modulating signals, a single side-band modulator, means for mixing said first modulating signal with said first quadrature reference signal and said second modulating signal with said second quadrature reference signal in said single side-band modulator to provide the output signal of said apparatus.

9. Apparatus as in claim 8 wherein said means for selectively filtering said difference frequency components comprises a resistance-capacitance network.

10. Apparatus as in claim 8 wherein said means for selectively filtering said difference frequency components comprises means arranged to preclude the presence of direct current in said first and second modulating signals.

11. Apparatus as in claim 8 and including first and second zero direct current level amplifiers for amplifying said first and second quadrature modulating signals for application to said single side-band modulator.

12. Frequency sensitive apparatus comprising, means for uniformly shifting input signals in a first frequency spectrum to provide a plurality of signal components each in a second frequency spectrum which includes zero frequency, means for selectively filtering at least zero frequency signals in said second frequency spectrum, and means for combining signals in said second frequency spectrum to provide filtered signals in said first frequency spectrum.

13. Frequency sensitive apparatus for selectively altering the frequency spectrum of an input signal comprising, first and second modulators energized by said input signal and a carrier signal, means for filtering the outputs of said modulators, and a single side-band modulator for mixing the filtered outputs of said first and second modulators with said carrier signal to provide a filtered output signal.

14. Apparatus as in claim 7 and including, means for selectively rejecting higher order modulation products in the output of said single side-band modulator.

15. Apparatus for filtering an input signal comprising, a reference signal source, first and second modulators energized by said input signal and by first and second quadrature components respectively of said reference signal, means for filtering the outputs of said first and second modulators to provide first and second modulating signals in phase quadrature, and a single side-band modulator for mixing said first and second quadrature components of said reference signal respectively with said first and second modulating signals.

16. Apparatus for filtering an input signal comprising, a reference signal source, first and second modulators energized by said input signal and by first and second quadrature components respectively of said reference signal, means for selecting the difference frequency outputs of said first and second modulators while substantially rejecting a frequency band therefrom to provide first and second modulating signals in phase quadrature, a single side-band modulator for mixing said first and second quadrature components of said reference signal respectively with said first and second modulating signals, and means for selecting frequency sums from said single side-band modulator.

References Cited in the file of this patent

UNITED STATES PATENTS

| | | |
|---|---|---|
| 2,020,409 | Green | Nov. 12, 1935 |
| 2,038,202 | Weis | Apr. 21, 1936 |
| 2,297,451 | Bendel | Sept. 29, 1942 |
| 2,362,898 | Gilman | Nov. 14, 1944 |